United States Patent [19]

Thrower, Jr. et al.

[11] 4,309,639
[45] Jan. 5, 1982

[54] LIGHT MODULATOR SYSTEM AND METHOD

[76] Inventors: Herbert T. Thrower, Jr., 4942C Sardis Rd., Charlotte, N.C. 28211; Donald S. Wasness, 462 Webber Rd., Spartanburg, S.C. 29302

[21] Appl. No.: 78,388

[22] Filed: Sep. 24, 1979

[51] Int. Cl.³ .............................................. B60Q 1/02
[52] U.S. Cl. ................... 315/82; 307/10 LS; 315/200 A; 307/269; 362/72
[58] Field of Search ................. 315/200 A, 82, 83; 307/269, 10 LS; 362/72, 74, 80

[56] References Cited

U.S. PATENT DOCUMENTS

| | | | |
|---|---|---|---|
| 2,891,195 | 6/1959 | Smyth | 315/200 A |
| 3,130,349 | 4/1964 | Mallory | 315/200 A |
| 3,631,359 | 12/1971 | Jones | 315/200 A |
| 3,660,674 | 5/1974 | Bolinger | 315/200 A |
| 3,710,185 | 1/1973 | Switsen | 315/200 A |
| 3,801,866 | 4/1974 | Schmidgall | 315/200 A |
| 4,149,113 | 4/1979 | Sammis | 315/200 A |
| 4,249,160 | 2/1981 | Chilvers | 315/82 |

FOREIGN PATENT DOCUMENTS 739583  7/1966  Canada ................. 315/200 A

*Primary Examiner*—Saxfield Chatmon, Jr.
*Attorney, Agent, or Firm*—Wellington M. Manning, Jr.; Luke J. Wilburn, Jr.

[57] ABSTRACT

A system for modulating an incandescent light to avoid total loss of illumination and to achieve improved conspicuity of the light along with subjective enhanced illumination. The modulating unit is electrically connected between a source of electrical power and the light to be modulated and includes a timer switch means operating at a duty cycle of at least 30 percent and a switching frequency of from about 2 to about 10 cycles per second, an amplifier transistor and a driver transistor, electrically connected thereto. Preferably the modulating unit is encapsulated to preclude effects of temperature, humidity and weather.

20 Claims, 5 Drawing Figures

LIGHT MODULATOR SYSTEM AND METHOD

BACKGROUND OF THE INVENTION

The present invention relates to a system for modulating vehicle, traffic, signal and other filament operated lights, primarily incandescent lights, including the quartz-halogen types to improve conspicuity of the presence of the light and to enhance the brightness of same while reducing power requirements and improving the longevity of the light.

As set forth in our prior patent, U.S. Pat. No. 4,114,071, modulation of lights associated with vehicles such as automobiles, emergency vehicles, motorcycles and the like renders the presence of the vehicle more conspicuous to both pedestrians and operators of other vehicles in the same general area. Such is particularly important for motorcycle use where a large percentage of fatalities related thereto are caused by lack of conspicuity, even though the head lamp is on at all times.

The modulator system of our prior patent employs a pair of timer switch means in conjunction with a power interrupter means. The first timer switch means operates at a preset frequency (generally around one cycle per second) with the second timer switch means operating at a much higher frequency (around 100 cycles per second) during the off mode of the first mode of the first timer switch means whereby rapidity of operation of the power interrupter means precludes a complete loss of illumination of the light. The above prior system is thus capable of modulation of light without an appreciable loss of intensity and does, in fact, lead to improved conspicuity. Further, the filament of the light does not lose adequate heat to cause damage thereto whereby life of the light is prolonged. While not specifically restricted to such, the modulator system of our prior patent was primarily designed for operation at a frequency of about the rate set forth above. At this low frequency rate, the second timer switch means is necessary to avoid loss of illumination of the light.

In like fashion to the system set forth above, the light modulator system of the present invention may be utilized in conjunction with any incandescent or other filament operated light. Such lights include without limitation, aircraft identification lights, marine craft identification lights, emergency and police vehicle headlights and identification, and motorcycle headlamps. Additionally other signal or identification lights such as traffic lights, directional signal lights, and emergency signals such as those utilized at school zones and other congested areas, on airport runways, for navigational direction, as well as any incandescent light that is utilized in advertising display or otherwise where improved conspicuity is desirable may be modulated with the improved system of the present invention.

The improved light modulator system according to the teachings of the present invention, while similar to the system set forth in our prior patent identified above, achieves improved and unexpected results over those for which the prior system was designed. It is believed that the present invention is patentably distinct from that set forth and claimed in our prior patent, and there is no additionally known prior art that is believed to anticipate or suggest the subject matter of the present invention.

SUMMARY OF THE INVENTION

It is an object of the present invention to provide an improved system for modulating a light without appreciable loss of intensity of same, while resulting in improved conspicuity of the light.

Another object of the present invention is to provide an improved light modulator system, the use of which results in subjective enhancement of luminescence of the light.

Yet another object of the present invention is to provide an improved light modulator system operating in a range of maximized visual conspicuity of the light.

Still further another object of the present invention is to provide an improved light modulator system in conjunction with a vehicle, particularly a motorcycle to achieve improved conspicuity of the presence of the vehicle.

Another object of the present invention is to provide an improved method for modulating a light to realize improved visual observation of the light while enhancing luminescence of same.

Generally speaking, the improved light modulator system according to the present invention comprises a timer switch means electrically connectable to a source of electrical power, said timer switch means being adapted for a switching cycle of between about two cycles per second and ten cycles per second and having a duty cycle of at least about 30% and preferably from about 30 to about 70 percent; a driver transistor electrically associable to the output of said timer switch means and being electrically connectable to a light bulb; an amplifying transistor electrically connected between said output of said timer switch means and said driver transistor and noise suppression means electrically connected to said driver transistor, whereby during operation where said system is connected between a source of electrical power and said lamp, said lamp is turned off and on with such freqency that there is no complete loss of illumination of the light and subjective light enhancement results.

More particularly, in a preferred arrangement according to the present invention, the improved light modulation system is encapsulated to protect same from damage due to weather or other conditions. Particularly, in a motorcycle environment, the modulator unit is totally encapsulated within appropriate polymeric materials such as an epoxy resin to isolate the electronic components from the effects of temperature, humidity, moisture and the like. A preferred timer switch means includes an integrated circuit chip such as a 555 I.C. timer chip, which is provided with a pair of resistors and a capacitor in series with respect to each other and in parallel with respect to the timer switch means, the individual values of which determine both the duty cycle and switching frequency of the timer switch means. The amplifying transistor is a PNP transistor in circuits where the duty cycle of the timer switch is less than 50%, and an NPN transistor for circuits having a duty cycle greater than 50%. The amplifying transistor is in electrical connection with the driver transistor which is connected between the source of power and the lamp such that the operational state of the driver transistor controls power input to the light. Particularly, the driver transistor periodically interrupts power to the light and causes illumination of the light to modulate. It is highly undesirable, if not critical, that the light not be switched off and on at frequencies low enough to cause the light to totally lose luminescence. With the system according to the present invention, i.e., an off-on system, the undesirable total loss of luminescence would occur should the periodicity of switching permit the filament to cool sufficiently to lose luminescence. Since, however, the switching frequency of the timer switch means is at least about two cycles per second, the light filament temperature does not cool below the 900°-1200° C. range before power is again supplied to the light, thus in essence modulating the light.

The light modulator system of the present invention is most advantageous in a vehicular application during daylight hours or otherwise when steady state light conspicuity is low. Hence, a conventional off-on switch may also be incorporated into the system of the present invention to permit the operator of the vehicle to override the system at night, or in areas of low ambient light.

DESCRIPTION OF THE PREFERRED EMBODIMENTS

A primary purpose of the light modulator system of both our prior U.S. Pat. No. 4,114,071, and of the present invention is to provide improved conspiquity of the light being so modulated. It has been determined, for example, that the greatest single cause of motorcycle accidents is the inability of an operator of a conventional automotive vehicle to observe the immediate presence of the motorcycle even though the motorcycle headlight is illuminated. It has been determined that when the motorcycle headlight is modulated as with the modulator system of our prior patent, conspicuity of motorcycle is improved. Similarly, police cars with modulating headlights and/or lights atop the vehicle are much more readily observed in traffic than with the conventional emergency lights. In like fashion, boat lights, airplane lights, traffic and other signals and the like are more readily observed under modulating conditions than when the light is maintained at a constant level of intensity. While the light modulating system of our prior patent did improve conspicuity of the light source, the system of the present invention represents yet further improvements with unexpected results as set forth below.

Prior optic and neurological research has determined a flashing light at a frequency value of approximately eight cycles per second approaches the alpha rhythm of the human brain. One observing a light flashing at a frequency coinciding with the alpha rhythm for a period can become very disquieted. Though no known cases have been reported, it has been said that epilepsy can be triggered by the effect of a light flashing in sync with the human alpha rhythm. The light modulator system of the prior patent was thus designed to operate in the frequency range referred to above to avoid any such neurological effects.

In further unrelated research, Brucke, in 1864, utilizing a revolving disc having a number of alternate black and white sectors, determined that at a frequency of 17.5 stimuli per second the impression of brightness exceeded that of the white sectors when stationary, and that the lower the frequency, the greater the brightness effect to a maximum in the range of around eight stimuli per second, after which the effect diminished to zero. The so called Brucke effect was determined to apply regardless of the light to dark ratio, i.e., the number of white sectors to black sectors. The Brucke effect is set forth in FIG. 2 for a light to dark ratio of one to one, i.e., an equal number of black and white sectors. Later in 1938, Bartley determined the validity of the Brucke effect and found further that a black and white sector disc was not necessary. The phenomenon occurred likewise with a flashing light. Bartley further validated the Brucke effect, at maximum enhancement in the neighborhood of eight flashes per second which coincides with the alpha rhythm of the human brain, and postulated an interrelationship between the two.

Figure 1:
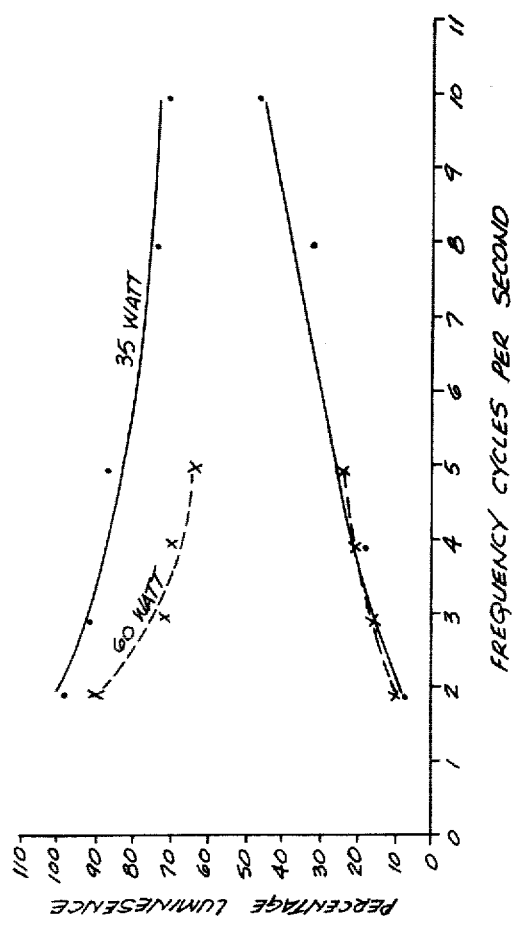
FIG. 1 is a graphical presentation of the effect of frequency on relative luminescence for incandescent lamps.
Figure 2:
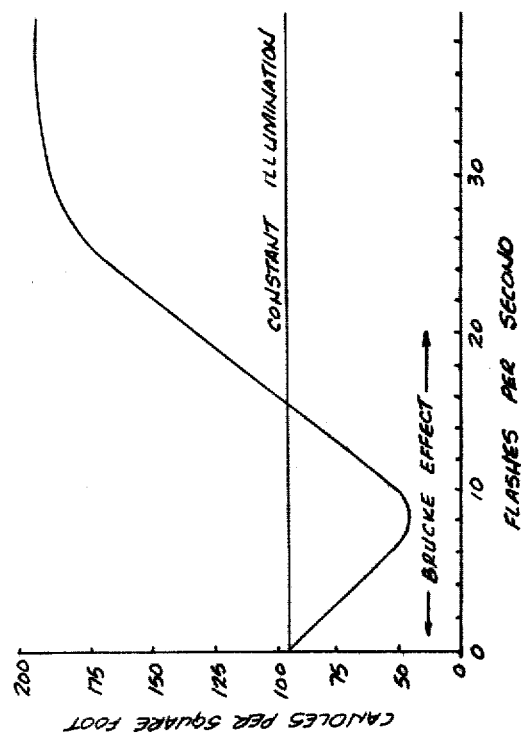
FIG. 2 is a graphical presentation of the Brucke effect on light enhancement.
Figure 3:
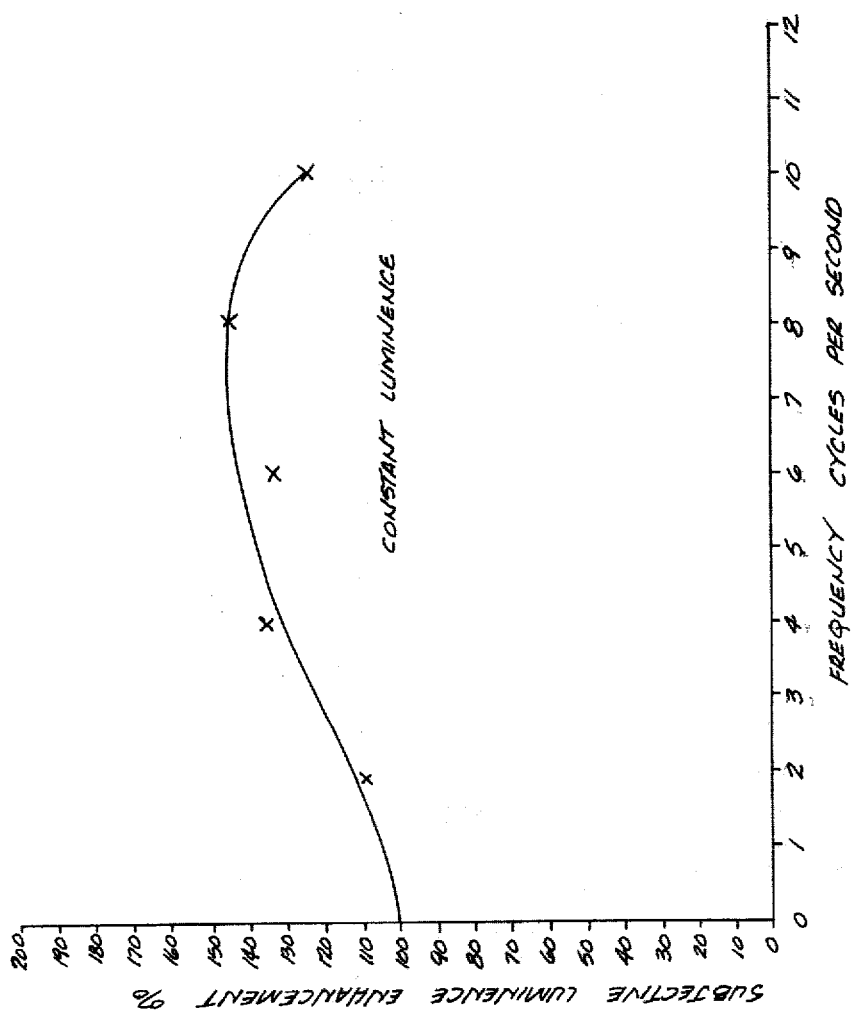
FIG. 3 is a graphical presentation of the effect of frequency on the combination of relative luminescence and light enhancement.

The effect of luminescence of a certain light was determined utilizing a modulator system according to the present invention. Resistors used to determine frequency of the timer switch means as will be hereinafter described were deleted and a potentiometer substituted therefor. Frequency of modulation could thus be varied. During the light modulation maximum and minimum percentages of luminescence were determined, using a phototransistor sensor with output displayed on an oscilloscope. FIG. 1 graphically illustrates frequency effects in maximum and minimum illumination for two different types of lamps. Referring to FIG. 1, at a frequency, for example, of four cycles per second modulation of luminescence of the lamp varied from a maximum 86 percent of total of luminescence to a minimum of 16 percent of total luminescence. When, however, consideration is given to the Brucke effect, the light enhancement realized at a frequency of four cycles per second would be added to the maximum and mnimum luminescence percentages, whereby a net light enhancement is achievable. Such is graphically illustrated in FIG. 3 which represents the composite of the curves of FIGS. 1 and 2 for a 35 watt bulb. Hence, utilizing the light modulator system of the present invention with a 35 or 60 watt bulb, one would expect maximum and minimum luminescence percentage values as represented in FIG. 2. When, however, modulation occurs in a low frequency range, within the Brucke effect, light enhancement values, when added to the maximum and minimum luminescence values produce overall light enhancement to the eye of the viewer. In fact, the subjective output of the 35 watt bulb as presented in FIG. 3 is equivalent to a bulb having a wattage of approximately 55.

While, as mentioned above, modulation synchronous with the alpha rhythm can produce adverse effects with prolonged visual observation, the closer the modulation frequency to the alpha rhythm, frequency, the more readily conspicuous the light source becomes, almost to a point where an observer reacts to the modulating light as an unconditioned reflex, and cannot resist looking at same. Such reaction was ascertained in an uncontrolled experiment in a hospital. A light equipped with a light modulation system was located within an open door at the end of a hall corridor approximately fifty feet long and having a Tee intersection at the opposite end. The light did not project on the wall at the intersection. Out of 300 persons that were counted crossing the corridor very few looked at the light burning at a constant intensity. When, however, the light was modulated at a frequency of four cycles per second, each of 296 people passing the corridor at the intersection immediately turned his head in the direction of the light, almost in startled fashion.

Utilizing the apparatus and method according to teachings of the present invention therefore, drastically improved conspicuity of a light source results along the enhanced luminescence of the lamp. Moreover, it has been ascertained that less power requirement in the order of around 40 percent is required to illuminate a lamp with the modulator system of the present invention than burning the lamp at a constant intensity. In view of the fact that the enhanced luminescence occurs, lower wattage bulbs may be utilized than normal to achieve a desired level of luminescence, whereby even less power requirements are needed. It is extremely important for bulb life that excess tungsten not distill from the filament which could ultimately lead to breakage of the filament. Likewise tungsten distilling from the filament will condense on the inner surface of the lens, causing clouding of the lens which reduces light output. Also, crystallization of tungsten at a filament temperature of about 1200° C. and prolonged operation around this temperature should be avoided. With the apparatus and method of the present invention, however, the modulation of the light is of adequate frequency that the filament temperature generally maintained above 1200° C., whereby cooling to the point of crystallization of tungsten is avoided. The filament does not reach temperatures normally found under conditions of constant intensity nor does it receive the shock that accompanies an on-off arrangement with virtually total loss of lumination. Less deterioration of the filament is thus experienced, whereby useful life of the light may be increased up to several times its normal life.

Figure 4:
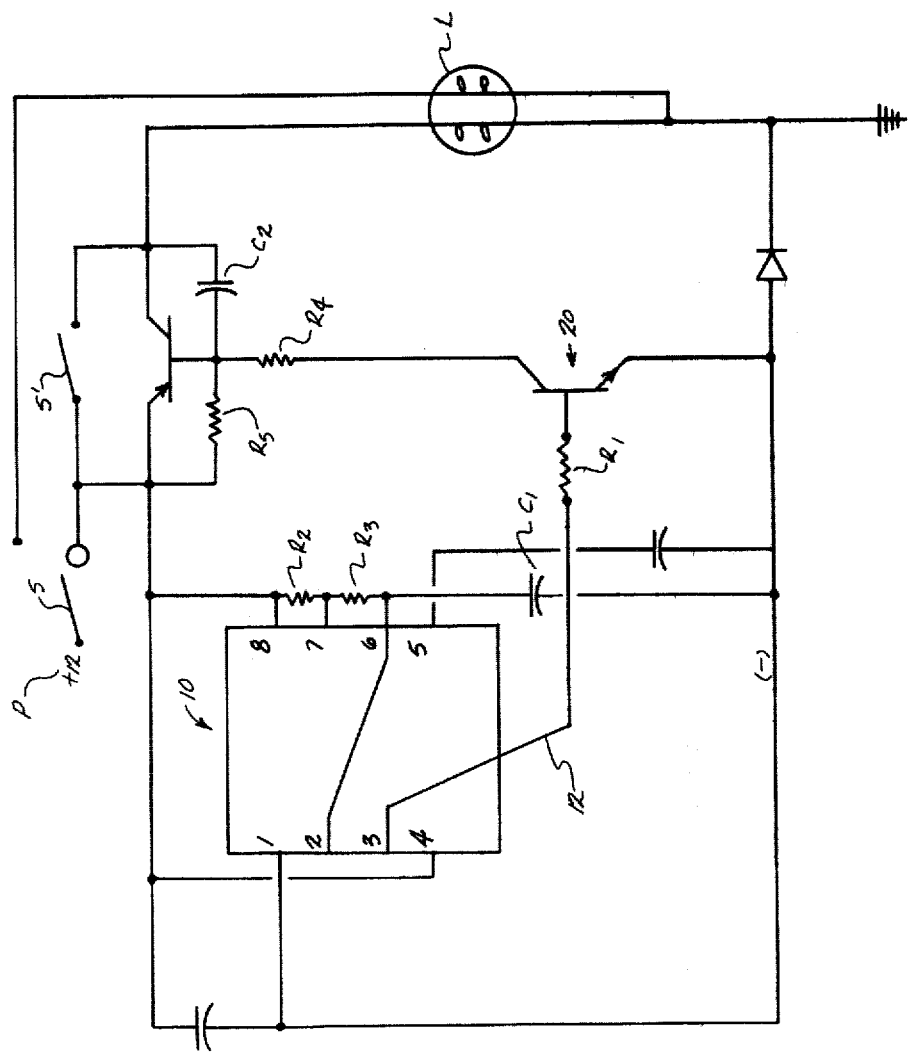
FIG. 4 is a schematic electrical diagram of a light modulator system according to teachings of the present invention.

Referring to FIG. 4, a preferred embodiment of the present invention will now be described in detail. The modulator system of the present invention is shown to be electrically connected between a source of power P and a light L. Source of power P may, by way of example, be a 12 volt battery of a motorcycle and the lamp L the headlamp of the motorcycle. Conveniently the unit may be connected between the dimmer switch S, and light L. When connected to the high beam side of dimmer switch S, the headlight is only modulated when the light is adapted for high beam luminescence. The modulator system of the present invention includes a timer switch means generally 10, an amplifier transistor generally 20 and a power interrupter driver transistor generally 30.

Timer switch means generally indicated as 10 is provided in electrical connection with the system, and is preferably a 555 I.C. chip having pin connections numerically indicated as 1-8. While the integrated circuit chip timer switch means is preferred, other oscillator or multi-vibrator units or other timer switch means may be employed so long as the intended function is performed. Timer switch means 10 is in electrical connection with both the power source P and ground. Pins 2 and 6 provide trigger input to timer switch means 10 while pin 3 has an output lead 12 connected at one end thereto and at an opposite end to a resistor $R_1$ which in turn is electrically connected to the base of amplifier transistor 20. Amplifier transistor 20 is in turn connected to ground at the emitter end, and at the collector end via resistor $R_4$ to driver transistor system 30 which interrupts power to lamp L to cause modulation of same. Timer switch means 10 has a pair of resistors $R_2$ and $R_3$ connected across pins 6, 7 and 8 and in series therewith a capacitor $C_1$ which is in turn connected to ground. In the embodiment shown in FIG. 4, amplifier transistor 20 is an NPN type transistor, while the transistor component of driver transistor system 30 is a PNP type transistor.

The duty cycle, i.e., the ratio of power on to power off is determined for timer switch means 10 by the relative values of resistors $R_2$ and $R_3$. The duty cycle of timer switch means 10 therefore determines the illumination level of light L during modulation. Likewise, the switching frequency of the positive going square wave generated by timer switch means 10 has a half cycle period equal to 0.693 $(R_2+R_3)$ $C_1$ and the amplitude of the output would be just short of supply voltage. Hence, the duty cycle and switching frequency of timer switch means 10 may be varied by preselection of resistors $R_2$ and $R_3$ and capacitor $C_1$. According to teachings of the present invention the duty cycle of the timer switch means should be at least 30 percent, preferably at least 50 percent, and most preferably around 60 percent. Frequency of modulation should be in a range of from about 2 to about 10 cycles per second, and preferably about 4 to about 6 cycles per second. While as mentioned above 8 cycles per second coincides with the alpha rhythm of the brain, under normal conditions, one would not be exposed to visualization of the modulating light for any prolonged period of time. Dimensions of the bulb filament determine reactivity of the filament, and while certain small diameter filaments may cool rapidly enough to provide adequate contrast for improved conspicuity, large diameter filaments may experience too great a thermal lag for adequate contrast, necessitating a low switching frequency. Hence in determining a proper frequency of modulation, the thermal characteristics of the bulb filament must be considered.

Driver transistor 30 is provided with a resistor $R_4$ between the base of same and the collector of amplifier transistor 20. A further resistor $R_5$ is connected across driver transistor 30 and provides a shunt resistance to preclude emitter to base leakage during hot weather which could partially cause transistor 30 to function as a closed switch and thus create a malfunction in the system. Operation of the modulator system according to the present invention in the range of cycle frequencies set forth herein creates noise that may be picked up on vehicle radios, including the citizen bands. To avoid the noise problem, a capacitor $C_2$ is connected between base and collector of transistor 30.

Operationally speaking, referring to timer switch means 10, pins 2 and 6, as mentioned above provide trigger input. When the voltage at pin 2 decreases to a level below one third of supply, pin 2 triggers and output pin 3 goes to supply voltage. Simultaneously, output pin 7 is unclamped and capacitor $C_1$ begins to charge through resistors $R_2$ and $R_3$. When capacitor $C_1$ is charged to a level of two thirds of supply voltage, pin 6 triggers output pin 3 to off and the voltage at pin 7 is clamped to ground. Capacitor $C_1$ then discharges through resistor $R_3$ and at the point where capacitor $C_1$ reduces to one third of supply voltage, the cycle repeats. Repetitions of the aforedescribed cycle continuously occur so long as supply potential is provided thereto. With output pin 3 of switch timer means 10 on, voltage at the base of transistor 20 permits transistor 20 to turn on which in turn places reistor R4 at ground, closing driver transistor 30 to turn on power to lamp L. The above system of FIG. 4 is for a duty cycle of fifty percent or greater.

Figure 5:
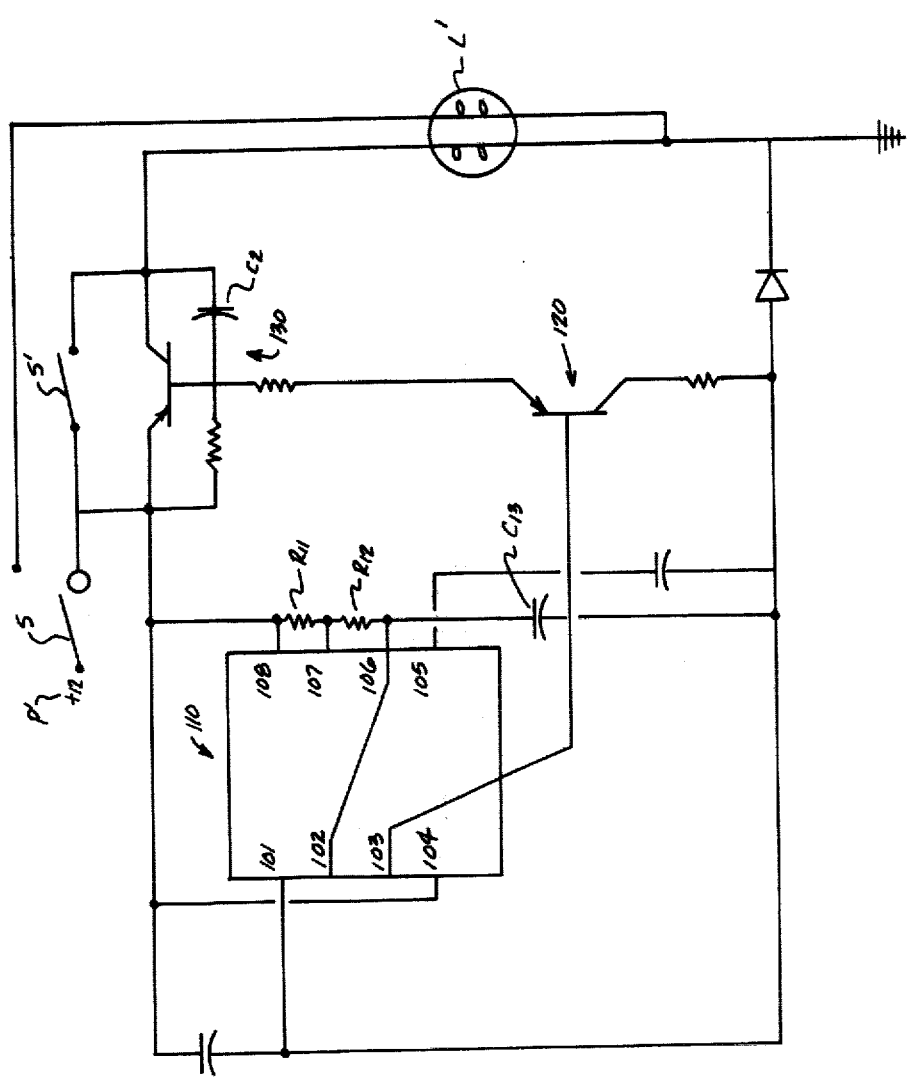
FIG. 5 is a further embodiment of a light moulator system according to teachings of the present invention.

The modulator system according to the present invention for a duty cycle of below 50 percent is illustrated in FIG. 5 where a timer switch means 110 having pin connections 101 through 108 is provided in electrical connection with an amplifying transistor 120 of the PNP type and a driver transistor 130. Operationally speaking, timer switch means 110 is controlled as to duty cycle and frequency by resistors $R_{11}$ and $R_{12}$ and capacitor $C_{13}$ in similar fashion to that expressed with respect to the timer switch means 10 of FIG. 4. Operationally speaking, the timer switch means 110 functions the same as timer switch means 10 of FIG. 4. When output pin 103 is high, amplifying transistor 120 is turned off, thereby opening driver transistor 130 and preventing power from passing to lamp L. When output at pin 103 is low, driver transistor 120 is turned on thus grounding the bottom of resistor R4. This turns on transistor 130, thus applying voltage to lamp L. FIG. 5 further includes in the electrical circuit a manual by-pass switch S'.

Having described the present invention in detail, it is obvious that one skilled in the art will be able to make variations and modifications thereto without departing from the scope of the invention. Accordingly, the scope of the present invention should be determined only by the claims appended hereto.

That which is claimed is:

1. An improved light modulator system for an incandescent light comprising:
   (a) a timer switch means electrically connectable to a source of electric power, said timer switch means being adapted for operation at a combination of a switching frequency of from 2 to 10 cycles per second, and a duty cycle of at least 30 percent;
   (b) an amplifier transistor electrically connected to an output of said timer switch means; and
   (c) a driver transistor electrically connected to said amplifier transistor and being electrically connectable between said source of electrical power and said light whereby during operation when said system is connected between said source of power and said light, said light is turned on and off with such frequency that improved conspicuity and subjective light enhancement result without a total loss of luminescence of the light.

2. The system as defined in claim 1 wherein the duty cycle of the timer switch means is at least 50 percent and the amplifier transistor is an NPN transistor.

3. The system as defined in claim 1 wherein the duty cycle is less than 50 percent and the amplifier transistor is a PNP transistor.

4. The system as defined in claim 1 wherein the timer switch means is an integrated circuit timer switch means with pin connections; said timer and switch means having a pair of resistors and a capacitor in series therewith, selection of the value of said resistors determining the duty cycle of said timer switch means and selection of the value of the resistors and the capacitor determining the switching frequency of the timer switch means.

5. The system as defined in claim 1 further comprising noise suppression means in electrical association with said driver transistor.

6. The system as defined in claim 5 wherein the noise suppression means is a capacitor connected across the base and collector of said driver transistor.

7. The system as defined in claim 1 wherein the system is encapsulated in a polymeric material.

8. A vehicular light modulation system comprising:
   (a) a source of electrical power;
   (b) at least one vehicular light in electrical connection with said source of electrical power;
   (c) switch means located along said electrical connection between said source of electrical power and said at least one light, said switch means having a low beam output and a high beam output; and
   (d) a modulating unit electrically connected between the high beam output of said switch means and said at least one light, said unit comprising a timer switch means operating at a combination duty cycle of at least 30 percent and switching frequency of from 2 to 10 cycles per second, an amplifier transistor in electrical connection with the output of said timer switch means and a driver transistor in electrical connection with said amplifier transistor, and in line between said high beam output of said switch means and said light, whereby when said switch means is actuated for high beam output, said modulating unit interrupts power to said light at a rate coincident with the switching frequency of said timer switch means to modulate intensity of said light and realize improved conspicuity and subjective illumination enhancement of said light without a total loss of luminescence of the light.

9. The system as defined in claim 8 wherein said modulating unit has noise suppression means associated therewith.

10. A method of modulating an incandescent light to realize improved conspicuity of the light and subjective enhancement of illumination of the light comprising the steps of including a switching means between the light and a source of electrical power, said switching means operating at a combination duty cycle of at least 30 percent and a switching frequency in range 0f from 2 to 10 cycles per second, whereby said light is modulated at a rate that total loss of illumination is avoided.

11. The method as defined in claim 10 wherein the duty cycle and switching frequency are selected to maintain temperature of the light filament above about 1200° C.

12. The method as defined in claim 10 wherein noise is suppressed during modulation of the light.

13. The method as defined in claim 10 wherein the light is a vehicular headlight.

14. An improved light modulator system for an incandescent light comprising:
   (a) switching means connectable between a source of electrical power and said light, said switching means being operable at a combination duty cycle of at least 30 percent and a switching frequency in a range of from 2 to 10 cycles per second, whereby said light is modulated with such frequency that improved conspicuity and subjective light enhancement result without a total loss of luminescence of the light.

15. The system as defined in claim 14 wherein the switching means comprises a timer switch means, amplifier means and power interrupter means.

16. The system as defined in claim 15 wherein the timer switch means is an integrated circuit timer switch means with pin connections; said timer switch means having a pair of resistors and a capacitor in series therewith, selection of the value of said resistors determining the duty cycle of said timer switch means and selection of the value of the resistors and the capacitor determining the switching frequency of the timer switch means.

17. The system as defined in claim 15 wherein the timer switch means is a multivibrator.

18. The system as defined in claim 15 wherein the amplifier means is a transistor.

19. The system as defined in claim 15 wherein the power interrupter means is a driver transistor.

20. An improved light modulator system for a vehicle light comprising switching means connectable between a source of electrical power and said light, said switching means being operable at a duty cycle of at least 30 percent and a switching frequency in a range of from about 4 to about 6 cycles per second, said switching means comprising timing means associated with power interrupter means, whereby during operation, power to said light is interrupted at a rate of from about 4 to about 6 times per second at a duty cycle of at least 30 percent whereby improved light conspicuity and subjective light enhancement result.

* * * * *